United States Patent Office 3,409,498
Patented Nov. 5, 1968

3,409,498
ADHESIVES FOR POLYOLEFIN RESINS COMPRISING PITCH AND A VINYL ALKYL ETHER POLYMER
John F. Suter, Charleston, and Ray C. Hamon, St. Albans, W. Va., assignors to Union Carbide Corporation, a corporation of New York
No Drawing. Continuation-in-part of application Ser. No. 307,798, Sept. 10, 1963. This application Dec. 21, 1964, Ser. No. 420,128
29 Claims. (Cl. 161—252)

This application is a continuation-in-part application of application of Ser. No. 307,798, entitled "Adhesives for Polyolefin Resins," filed Sept. 10, 1963, and now abandoned.

This invention relates to adhesives for polyolefin resins. More particularly, this invention relates to mixtures containing pitch and poly(vinyl alkyl ethers) as adhesives for polyolefin resins.

Polyolefin films, particularly polyethylene and polypropylene films, have found widespread use as waterproofing barriers; for example, sheets of such materials are used to provide waterproofing of sub-grade construction, such as basements and foundations of buildings. Polyolefin films and sheets have also found widespread use in the manufacture of containers for water or aqueous solution, for example, in the manufacture of plastic swimming pools. However, it is often the case that practical-sized sections of such films or sheets are of insufficient length to produce the desired size barrier or container. This has necessitated the joining of sections of the plastic, either to itself, or to some substrate, thus creating a need for a suitable adhesive.

In accordance with the instant invention it has been discovered that an excellent adhesive for bonding polyolefins to themselves and to other substrates can be prepared by blending together a pitch as hereinafter defined with a poly(vinyl alkyl ether). While either of these substances alone show little tendency to bond polyolefin resins to themselves or to other substrates, when employed together they form a very binding adhesive for these materials.

When pitch alone is employed as an adhesive for polyolefin resins, for example, to bind polyethylene film to limestone blocks in sub-grade construction, the bond formed is quite weak and shows little resistance to stress. Oftentimes, for example, the force of gravity alone is sufficient to cause the film to strip from the construction within minutes, before backfilling operations can be completed.

Likewise, when a poly(vinyl alkyl ether) is employed alone as an adhesive for binding polyolefins to themselves or to other substrates, only weak easily separable bonds are effected. However, when a blend of the poly(vinyl alkyl ether) with pitch is employed, the two materials exert a surprising synergistic effect upon each other and produce strongly adherent bonds which are far superior to those produced by either component of the blend individually.

The adhesive compositions of the instant invention are produced by blending pitch with a poly(vinyl alkyl ether) in the presence of a suitable inert liquid solvent until a homogeneous, completely miscible, fluid mass results. The pitch, poly(vinyl alkyl ether), and solvent are mixed and continuously agitated, with heat being supplied if necessary, until fluidization of the pitch and poly(vinyl alkyl ether) results, either by solution or by softening due to heat, and a completely miscible, homogeneous, fluid mixture is produced. If desired, a pasting oil from a coal hydrogenation process, or some other suitable inert liquid diluent, can be employed as a means of solvating the poly(vinyl alkyl ether) and lowering the softening point of the pitch. The solvents found to be most useful in solvating the pitch and poly(vinyl alkyl ether) are the liquid hydrocarbons, such as hexane, heptane, benzene, toluene, xylene, and the like. However, while such solvents are advantageously employed in initially effecting solution of the pitch and poly(vinyl alkyl ether), it may be desirable to flash off most of such solvents after blending has been effected, particularly in the case of aliphatic hydrocarbon solvents, as appreciable quantities of such solvents cause curling of the polyolefin films to which they are applied. A small amount of the hydrocarbon is desirably retained, however, as it materially assists in maintaining a homogeneous blend. The flashed-off hydrocarbon solvent can be replaced with solvents other than hydrocarbons, such as acetone, methyl ethyl ketone, methyl isobutyl ketone, isophorone, pyridine, carbon disulfide, and the like, in order to maintain a suitable fluid consistency. These solvents can be used initially or added to the fluidized mixture after the hydrocarbon solvent has been flashed off. In addition to such solvents, various other inert liquid diluents can also be incorporated into the blend as viscosity modifiers, including, among others, tall oil, linseed oil, oleic acid, linoleic acid, linolenic acid, coal tar distillation oils, and pasting oils from coal hydrogenation processes. Other inert additives which increase the body or spreading ability of the adhesive mixture may also be incorporated into the blend, including pigments and fillers, such as carbon black, asbestos, talc, barytes and silica, and synthetic polymers, for example, the poly(alkylene oxide) resins, such as poly(ethylene oxide), poly(propylene oxide), poly(butylene oxide), and the copolymers thereof, as well as natural polymers, such as cellulose, and polymers derived from natural polymers, for example an alkyl cellulose such as ethyl cellulose. The solvents, diluents and additives employed to increase the body or spreading ability all in some way modify the viscosity of the adhesive mixture and can collectively be termed viscosity modifiers. In addition to such viscosity modifiers, other additives, conventionally used and well known in the art, can be incorporated into the blends of the instant invention. These modifiers and additives should be carefully chosen, of course, to avoid hydrophilic materials which would impair the effectiveness of the adhesive when exposed to water.

The most preferred method of effecting blending is to add a solution of the poly(vinyl alkyl ether) in an aliphatic hydrocarbon to pitch which has been heated to produce an even, fluid mass. The resulting mixture is heated with constant agitation to produce a homogeneous, completely miscible fluid mixture, and after this the aliphatic hydrocarbon is flashed off and other modifying ingredients are blended in. However, the order of blending is not restricted to that described in this paragraph, and can be altered, if desired.

The pitch, poly(vinyl alkyl ether), and viscosity modifiers should be blended together to produce a fluid mixture which is completely miscible and homogeneous at ambient temperatures. In general, satisfactory adhesive mixtures can be prepared by blending together from about 10 parts by weight to about 90 parts by weight, preferably from about 20 parts by weight to about 70 parts by weight, of pitch, with from about 2 parts by weight to about 50 parts by weight, preferably from about 5 parts by weight to about 30 parts by weight, of poly(vinyl alkyl ether), and from about 5 parts by weight to about 96 parts by weight, preferably from about 25 parts by weight to about 67 parts by weight, of viscosity modifiers.

The pitches that can be blended with a poly(vinyl alkyl ether) to produce the adhesive compositions of the instant invention are those obtained from coal hydrogenation and coal hydrocarbonization processes, as well as tall oil pitch, and those pitches set forth by Abraham on page 61, volume I, of "Asphalts and Allied Substances," sixth edition, 1960, published by D. Van Nostrand Company, Inc., under the species "Pitches" of genus "Pyrogenous residues" in Table III, "Classification of Bituminous Substances." Thus, the term "pitch" as used in this specification is intended to encompass coal hydrogenation pitch, coal hydrocarbonization pitch, tall oil pitch, oil-gas-tar pitch, water-gas-tar pitch, wood-tar pitch, peat-tar pitch, lignite-tar pitch, shale-tar pitch, gas-works coal-tar pitch, coke-oven coal-tar pitch, blast-furnace coal-tar pitch, producer-gas coal-tar pitch, bone-tar pitch, rosin pitch, and fatty-acid pitch. Asphalts and other bituminous substances do not produce the same adhesive effects as the pitches set forth above and for this reason are not employed in the composition of the instant invention.

The poly(vinyl alkyl ethers) that can be blended with pitch to produce the adhesive compositions of the instant invention are produced from vinyl alkyl ether monomers which can be represented by the formula

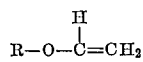

wherein R is an alkyl radical having from 1 to about 20 carbon atoms, preferably from 2 to 8 carbon atoms. Illustrative of the compounds which can be used to produce such polymers are vinyl methyl ether, vinyl ethyl ether, vinyl n-propyl ether, vinyl isopropyl ether, vinyl n-butyl ether, vinyl isobutyl ether, vinyl n-pentyl ether, vinyl n-hexyl ether, vinyl 4-methylpentyl ether, vinyl n-heptyl ether, vinyl n-octyl ether, vinyl 2-ethylhexyl ether, vinyl n-nonyl ether, vinyl n-decyl ether, vinyl 2,2-dimethyldecyl ether, vinyl n-tridecyl ether, vinyl n-tetradecyl ether, vinyl n-pentadecyl ether, vinyl n-octadecyl ether, and vinyl n-eicosyl ether.

The poly(vinyl alkyl ethers) which can be employed in producing the adhesive compositions of the instant invention are generally characterized by a reduced viscosity value in benzene of from about 1 to about 6.5. The most suitable polymers for use in the compositions of the instant invention are those characterized by a reduced viscosity in benzene of from about 3.5 to about 6.5, although suitable compositions can be formulated from the poly(vinyl alkyl ethers) having both higher and lower reduced viscosities.

The poly(vinyl alkyl ethers) employed in the instant invention can be prepared by polymerizing a suitable vinyl alkyl ether by means of a Friedel-Crafts or related catalyst. Among the compounds which can be employed as catalysts are boron trifluoride, boron trifluoride complexes, stannic chloride, gallium trichloride, iodine, aluminum salts, and the like. Generally, temperatures of from about −100° C. to about 100° C., preferably from −80° C. to 0° C., are suitable. Known solvents can be employed in the polymerization mixture if desired, including hydrocarbons, halogenated hydrocarbons, and ether-type compounds.

The adhesive compositions of the instant invention can be used to bind polyolefin sheets and molded products to themselves and to a wide variety of other substrates. Among the polyolefins which can be bound by these adhesive compositions are those obtained from alpha-mono-olefins having from 2 to about 10 carbon atoms, such as polyethylene, polypropylene, polybutene-1, poly(3-methyl-1-butene), poly(4-methyl - 1 - pentene), polydecene-1, polystyrene, and the like. Such polyolefins can be bound to substrates such as metal, wood, concrete, paper, glass, cinder block, limestone block, and the like.

Particularly effective adhesive compositions for bonding polyolefins have been prepared by blending a tall oil pitch with a poly(vinyl alkyl ether), particularly poly(vinyl ethyl ether), in a suitable inert liquid solvent. Since tall oil pitch is butter-like in nature at ordinary temperatures, the mixture often lacks body, and it is usually desirable to increase the body of the mixture to a more suitable consistency by means of a suitable viscosity modifier, such as an alkyl cellulose. Ethyl cellulose has been found particularly suitable for this purpose. When ethyl cellulose is employed, it preferably contains from about 2.00 mols to about 2.69 mols, most preferably from about 2.43 mols to about 2.54 mols, of ethoxy per glucose unit, and has an absolute viscosity of from about 7 centipoises to about 250 centipoises, most preferably from about 95 centipoises to about 105 centipoises, when measured as a 5 percent by weight solution in a blend of 80 parts by volume of toluene and 20 parts by volume of absolute ethanol at 25° C. with an Ostwald viscometer. When other alkyl celluloses are employed, care must be taken to avoid an alkoxy/glucose unit ratio which will impart a pronounced hydrophilic character to the cellulose. Each alkoxy group of such alkyl celluloses preferably contains from 1 to 7 carbon atoms, most preferably from 1 to 2 carbon atoms.

The mixtures of tall oil pitch, poly(vinyl alkyl ether), alkyl cellulose, and inert liquid solvent which are the most valuable adhesive compositions are those prepared by blending together from about 10 parts by weight to about 90 parts by weight, preferably from about 20 parts by weight to about 65 parts by weight, of tall oil pitch, with from about 2 parts by weight to about 50 parts by weight, preferably from about 5 parts by weight to about 30 parts by weight, of poly(vinyl alkyl ether), together with from about 1 part by weight to about 15 parts by weight, preferably from about 2 parts by weight to about 12 parts by weight, of alkyl cellulose, and from about 5 parts by weight to about 95 parts by weight, preferably from about 35 parts by weight to about 65 parts by weight, of inert liquid solvent.

The following examples are set forth for purposes of illustration so that those skilled in the art may better understand this invention, and it should be understood that they are not to be construed as limiting this invention in any manner. The shear strength and peel strength tests employed in evaluating the binding ability of the adhesive compositions of the examples were run on a conventional Instron Testing Machine.

The term "reduced viscosity" ($I_R$), employed in the examples and throughout this specification, is a measure of the molecular weight of a polymer, and may be defined by the equation:

$$I_R = \frac{\frac{\Delta N}{N_o}}{C}$$

wherein $\Delta N$ is the difference in seconds between the flow-time of a solution of polymer through a capillary viscometer and the flow-time of the solvent, $N_o$ represents the flow-time of the solvent, and C is the concentration of polymer in said solution in grams per 100 milliliters of solvent. The value of $\Delta N/N_o$ is known as the specific viscosity. Reduced viscosity values in the examples and throughuot the specification have reference to measurements made at 20° C. using benzene as solvent, and a solution of 0.1 gram of polymer per 100 milliliters of solvent.

Example 1

Twenty (20) grams of pasting oil from a coal hydrogenation process were mixed with 30 grams of a 25 percent by weight solution of poly(vinyl ethyl ether) in n-heptane. The poly(vinyl ethyl ether) employed had a reduced viscosity of 3.6. The mixture was heated to 150° C. and maintained at this temperature until all the n-heptane distilled off. Forty (40) grams of a coal hydrogenation pitch having a softening temperature of 127° C. were then added, and the resulting mixture was heated, with stirring, to 175° C. When the blend was smooth and uniform in appearance heating was discontinued. When the temperature of the blend dropped to 140°–145° C., 50 grams of xylene were added and the mixture was stirred to uniform consistency and allowed to cool to room temperature.

The cooled blend was bushed on the side surface of a limestone building block. After ten minutes of drying, a strip of clear polyethylene film having a thickness of four mils was smoothed on over the blend-covered surface of the block. The film tightly adhered to the block for one week before it was deliberately removed.

When a similar block was treated with a commercial foundation tar, a similar polyethylene strip adhered to the block for only fifteen minutes before it fell off due to the force of gravity.

Example 2

Two hundred and fifty (250) grams of pasting oil from a coal hydrogenation process were mixed with 200 grams of a 25 percent by weight solution of poly(vinyl ethyl ether) in n-hexane. The poly(vinyl ethyl ether) employed had a reduced viscosity of 3.6. The mixture was heated to 150° C. and maintained at this temperature, with stirring, until all of the ingredients were well blended and all the n-hexane distilled off. Two hundred (200) grams of a coal hydrogenation pitch having a sofening temperature of 127° C. were then added to the hot mixture with stirring, until a uniform blend was effected. The temperature of the blend was then allowed to fall to nearly room temperature when 200 grams of toluene and 10 grams of poly(ethylene oxide) resin having a reduced viscosity of 0.80 were added to improve the spreading ability of the blend.

The cooled blend was brushed on the side of a wall formed by stacking six cinder blocks in two columns, three blocks high, with ends abutting. After two hours of drying at 85° F., a sheet of clear polyethylene film having a thickness of six mils was applied to the coated surface and rolled firmly in place with a rubber roller. Seven months later the adhesion of the polyethylene film to the cinder blocks was still found to be excellent despite exposure to rain storms and sub-freezing temperatures.

Example 3

Two hundred (200) grams of a coal hydrogenation pitch having a softening temperature of 127° C. were mixed with 140 grams of a pasting oil from a coal hydrogenation process. The mixture was heated to 130° C. and maintained at this temperature, with stirring, until the ingredients were well blended. Two hundred (200) grams of a 25 percent by weight solution of poly(vinyl ethyl ether) in n-heptane were then added to the hot mixture, with stirring, until a uniform blend was effected. The poly(vinyl ethyl ether) employed had a reduced viscosity of 3.6. The temperature of the blend was allowed to fall to 100° C. and 100 grams of xylene and 100 grams of n-heptane were then blended in.

After the blend had cooled to room temperature, it was brushed along one edge of each of two clear four mil thick polyethylene sheets so as to form a two-inch wide border on each sheet. After thirty minutes of drying, the sheets were joined at their coated portions by lapping and rolling the film along the joint with a small rubber squeegee roller. The joined sheets were then allowed to stand for 2–3 hours to permit the adhesive to dry.

After the adhesive had dried, the bonded film was gathered into a crude sack with the bonded edge along the bottom, and approximately one-half gallon of water was placed in the sack. The mount was twisted shut and tightly wired closely with a heavy strand of wire. The entire system was then suspsended, free of support, from an overhanging hook.

One month after the water had been placed in the bag, the bag was examined and no evidence of water loss could be found. The system was then placed in a deep-freeze at −20° C. for 16 hours, and then resuspended from the hook and allowed to come to room temperature. No leakage from the sack was observed.

After being suspended 27 months there was no visible loss of water from the sack. At the end of this time the sack was emptied and allowed to dry at room temperature for 18 hours. The bonded film was tested on an Instron Testing Machine, at a loading rate of 2 inches/minute, and the adhesive joint was found to have a shear strength greater than that of the polyethylene film (shear strength of polyethylene film=7.2 pounds/inch width) and a peel strength of 1.08 pounds/inch of width.

Example 4

To a 25-gallon autoclave were charged 35.8 pounds of a pasting oil from a coal hydrogenation process and 66.8 pounds of a coal hydrogenation pitch having a softening temperature of 153° C. The mixture was heated to 180° C. and maintained at this temperature for one hour, with agitation, to insure even melting throughout the mixture. The temperature of the mixture was then allowed to fall to 85° C. when a second mixture was added, with stirring, which contained 9.5 pounds of tall oil, 9.4 pounds of an 80 percent by weight solution of poly(vinyl ethyl ether) (having a reduced viscosity of 0.2) in n-hexane, 27.4 pounds of a 25 percent by weight solution of poly(vinyl ethyl ether) (having a reduced viscosity of 3.6) in n-hexane, and 8.2 pounds of isophorone. The resulting mixture was then heated to 110° C. and maintained at this temperature for one hour to insure uniform blending. The temperature of the mixture was then allowed to fall to 90° C. where 12 pounds of n-hexane (of the 22.4 pounds total) were flashed off. Two (2) pounds of isophorone were then added, and the temperature was allowed to fall further to 60° C. where 4.9 pounds of acetone were added. Agitation of the mixture was continued for 1.5 hours at 60° C.

The mixture was then combined with several other batches of adhesive prepared in the same manner, and the combined mixture was used to bond together sheets of eight mil thick black polyethylene film. Bonding was effected by applying beads of adhesive about ⅜″ in diameter from a caulking gun in a line about ¾″ from the edge of one polyethylene sheet, overlapping a second polyethylene sheet over the beaded portion of the first sheet, and using a lawn roller to spread the beaded adhesive into a band 3–4″ wide. The application rate was approximately one gallon of adhesive per 100 lineal feet of film.

The bonded film was used to line the bottom of a 14-acre, nine feet deep, brine reservoir by placing the bonded film at the bottom of the reservoir and anchoring it with a 6″ layer of compact backfill.

Prior to lining the reservoir, a perceptible daily drop in the liquid level was observed. After the reservoir had been lined, no perceptible loss of liquid was observed after two months.

Example 5

Two hundred and fifty (250) grams of a commercial coal tar pitch having a melting point of 40° C. were heated to a temperature of 70° C. to render the pitch fluid. One hundred (100) grams of a 25 percent by weight solution of poly(vinyl ethyl ether) having a reduced viscosity of 3.6) in n-hexane were added to the fluid pitch, and the mixture was thoroughly blended with the heat source removed.

When the blend was cooled to room temperature, a bead of adhesive about ¼″ in diameter was applied to a strip of clear polyethylene six mils thick. A second strip of polyethylene of similar size was then lapped over the first strip, and the beaded adhesive was rolled into a thin band 3–4″ wide by means of a roller at a pressure of 2 kg./sq. in. The assembly was then permitted to dry at 23° C. and 50 percent relative humidity for 24 hours.

When the bonded film was tested on an Instron Testing Machine, at a loading rate of 2 inches/minute, the adhesive joint was found to have a peel strength of 0.52 pound/inch of width.

When the procedure was repeated employing a blend prepared in the manner described above but without any poly(vinyl ethyl ether), there was no adhesion whatsoever between the two polyethylene strips.

When the procedure was repeated employing the same blend but without any pitch being present, the adhesive joint was found to have a peel strength of 0.02 pound/inch of width.

Example 6

One hundred and seventy-five (175) grams of a commercial coal tar pitch having a melting point of 56° C. were heated to a temperature of 90° C. to render the pitch fluid. One hundred (100) grams of a 25 percent by weight solution of poly(vinyl ethyl ether) (having a reduced viscosity of 3.6) in n-hexane were added to the fluid pitch, and the materials were thoroughly blended with the heat source removed.

When the blend was cooled to room temperature, a bead of adhesive about ¼" in diameter was applied to a strip of clear polyethylene six mils thick. A second strip of polyethylene of similar size was then lapped over the first strip and the beaded adhesive was rolled into a thin band 3–4" wide by means of a roller at a pressure of 2 kg./sq. in. The assembly was then permitted to dry at 23° C. and 50 percent relative humidity for 24 hours.

When the bonded film was tested on an Instron testing machine, at a loading rate of 2 inches/minute, the adhesive joint was found to have a peel strength of 1.18 pounds/inch of width.

When the procedure was repeated employing a blend prepared in the manner described above but without any poly(vinyl ethyl ether), there was no adhesion whatsoever between the two polyethylene strips.

When the procedure was repeated employing the same blend but without any pitch being present, the adhesive joint was found to have a peel strength of 0.02 pound/inch of width.

Example 7

Sixty (60) grams of a commercial tall oil pitch which was pasty at room temperature were mixed with 60 grams of a 25 percent by weight solution of poly(vinyl ethyl ether) (having a reduced viscosity of 3.6) in n-hexane, and the mixture was stirred at ambient temperature to effect an intimate mixture.

After the mixture was well blended, a bead of the product about ¼" in diameter was applied to a strip of clear polyethylene six mils thick. A second strip of polyethylene of similar size was then lapped over the first strip and the beaded adhesive was rolled into a thin band 3–4" wide by means of a roller at a pressure of 2 kg./sq. in. The assembly was then permitted to dry at 23° C. and 50 percent relative humidity for 24 hours.

When the bonded film was tested on an Instron testing machine, at a loading rate of 2 inches/minute, the adhesive joint was found to have a peel strength of 3.0 pounds/inch of width.

When the procedure was repeated employing a blend prepared in the manner described above but without any poly(vinyl ethyl ether), the adhesive joint was found to have a peel strength of 0.025 pound/inch of width.

When the procedure was repeated employing the same blend but without any pitch being present, the adhesive joint was found to have a peel strength of 0.02 pound/inch of width.

Example 8

Thirty-two (32) grams of a pasting oil from a coal hydrogenation process were mixed with 48 grams of a coal hydrogenation pitching having a softening temperature of 153° C. The mixture was heated to 160° C. and maintained at this temperature until a uniform, fluid mixture resulted. The temperature of the mixture was then allowed to fall to 100° C. when 190 grams of a 10 percent by weight solution of poly(vinyl n-butyl ether) (having a reduced viscosity of 6.1) in toluene were added. The resulting mixture was stirred continuously until the temperature dropped to 70° C., at which point the mixture was smooth and uniform in appearance.

When the blend was cooled to room temperature, a bead of adhesive about ¼" in diameter was applied to a strip of clear polyethylene six mils thick. A second strip of polyethylene of similar size was then lapped over the first strip and the beaded adhesive was rolled into a thin band 3–4" wide by means of a roller at a pressure of 2 kg./sq. in. The assembly was then permitted to dry at 23° C. and 50 percent relative humidity for 24 hours.

When the bonded film was tested on an Instron Testing Machine, at a loading rate of 2 inches/minute, the adhesive joint was found to have a peel strength of 0.697 pound/inch of width.

When the procedure was repeated employing a blend prepared in the manner described above but without any poly(vinyl n-butyl ether), there was no adhesion whatsoever between the two polyethylene strips.

When the procedure was repeated employing the same blend but without any pitch being present, the adhesive joint was found to have a peel strength of 0.07 pound/inch of width.

Example 9

The adhesive prepared in accordance with Example 4 was applied to a strip of clear polypropylene 12 mils thick in the form of a bead about ¼" in diameter. A second strip of polypropylene of similar size was then lapped over the first strip and the beaded adhesive was rolled into a thin band 3–4" wide by means of a roller at a pressure of 2 kg./sq. in. The assembly was then permitted to dry at 23° C. and 50 percent relative humidity for 24 hours.

When the bonded film was tested on an Instron Testing Machine, at a loading rate of 2 inches/minute, the adhesive joint was found to have a peel strength of 2.4 pounds/inch of width.

Example 10

One hundred (100) grams of a coal hydrocarbonization pitch having a softening temperature of 170° C. were mixed with 100 grams of a pasting oil from a coal hydrogenation process. The mixture was heated with stirring until the entire blend was liquefied. The temperature of the blend was then allowed to fall to 85° C. when 100 grams of a 25 percent by weight solution of poly(vinyl ethyl ether) (having a reduced viscosity of 3.6) in n-heptane were added. The resulting mixture was then heated to 100° C. and maintained at this temperature, with stirring, until 38 grams of the n-hexane distilled off. The temperature of the blend was allowed to fall to 50° C. and 50 grams of acetone were blended in with the heat source removed.

When the blend was cooled to room temperature, a bead of adhesive about ¼" in diameter was applied to a strip of clear polyethylene six mils thick. A second strip of polyethylene of similar size was then lapped over the first strip, and the beaded adhesive was rolled into a thin band 3–4" wide by means of a roller at a pressure of 2 kg./sq. in. The assembly was then permitted to dry at 23° C. and 50 percent relative humidity for 24 hours.

When the bonded film was tested on an Instron Testing Machine, at a loading rate of 2 inches/minute, the adhesive joint was found to have a peel strength of 4.9 pounds/inch of width.

When the procedure was repeated employing a blend prepared in the manner described above but without any poly(vinyl ethyl ether), there was no adhesion whatsoever between the two polyethylene strips.

When the procedure was repeated employing the same blend but without any pitch being present, the adhesive joint was found to have a peel strength of 0.02 pound/inch of width.

Example 11

Twenty-eight and one-half (28.5) parts by weight of a 25 percent by weight solution of poly(vinyl ethyl ether) (having a reduced viscosity of 3.6) in n-hexane were added to 71.5 parts by weight of a 60 percent by weight solution of petroleum asphalt in toluene, and the mixture was stirred thoroughly to effect blending. The asphalt employed was 61–70 Penetration Grade.

The blend was brushed on the side surface of a limestone building block. After one hour of drying, a strip of clear polyethylene film having a thickness of four mils was smoothed on over the blend-covered surface of the block with a rubber roller. However, when pressure from the roller was removed, the polyethylene sheet fell from the block under its own weight.

When the procedure was repeated employing 200–250 Penetration Grade petroleum asphalt the same result was obtained.

Example 12

Eleven and three-tenth (11.3) grams of ethyl cellulose were dissolved in 182 grams of acetone, and the resulting solution was blended at ambient temperature with 76.2 grams of a commercial tall oil pitch. The ethyl cellulose employed had 2.43 to 2.54 mols of ethoxy per glucose unit and an absolute viscosity of 10 centipoises when measured as a 5 percent by weight solution in a blend of 80 parts by volume of toluene and 20 parts by volume of absolute ethanol at 25° C. with an Ostwald viscometer.

One hundred (100) grams of a 25.4 percent by weight solution of poly(vinyl ethyl ether) (having a reduced viscosity of 3.6) in n-hexane were then added, and the mixture was heated to 50° C. and maintained at this temperature until 182 grams of solvent were removed. The resulting compositions contained 40.64 percent by weight tall oil pitch, 13.55 percent by weight poly(vinyl ethyl ether), 6.03 percent by weight ethyl cellulose, and 39.78 percent by weight acetone.

After the blend had cooled to room temperature, it was brushed along one edge of each of two eight mil thick polyethylene sheets so as to form a two-inch wide border on each sheet. After thirty minutes of drying, the sheets were joined at their coated portions by lapping and rolling the film along the joint with a roller at a pressure of 2 kg./sq. in. The assembly was then permitted to dry at 73° F. and 50 percent relative humidity for 4 days.

When the bonded film was tested on an Instron Testing Machine, at a loading rate of 2 inches/minute, the adhesive joint was found to have a shear strength greater than that of polyethylene film (shear strength of polyethylene film=7.2 pounds/inch width) and a peel strength of 5.1 pounds/inch of width.

When the procedure was repeated with ten mil thick polyethylene sheets, the adhesive joint was found to have a shear strength greater than that of polyethylene film (shear strength of polyethylene film=8.6 pounds/inch width) and a peel strength of 4.9 pounds/inch of width.

Example 13

Eleven and three-tenth (11.3) grams of ethyl cellulose were dissolved in 182 grams of acetone, and the resulting solution was blended at ambient temperature with 76.2 grams of a commercial tall oil pitch. The ethyl cellulose employed had 2.43 to 2.54 mols of ethoxy per glucose unit and an absolute viscosity of 100 centipoises when measured as a 5 percent by weight solution in a blend of 80 parts by volume of toluene and 20 parts by volume of ethanol at 25° C. with an Ostwald viscometer.

One hundred (100) grams of a 25.4 percent by weight solution of poly(vinyl ethyl ether) (having a reduced viscosity of 3.6) in n-hexane were then added, and the mixture was heated to 50° C. and maintained at this temperature until 182 grams of solvent were removed. The resulting composition contained 40.64 percent by weight tall oil pitch, 13.55 percent by weight poly(vinyl ethyl ether), 6.03 percent by weight ethyl cellulose, and 39.78 percent by weight acetone.

After the blend had cooled to room temperature, it was brushed along one edge of each of two eight mil thick polyethylene sheets so as to form a two-inch wide border on each sheet. After thirty minutes of drying, the sheets were joined at their coated portions by lapping and rolling the film along the joint with a roller at a pressure of 2 kg./sq.in. The assembly was then permitted to dry at 73° F. and 50 percent relative humidity for 4 days.

When the bonded film was tested on an Instron Testing Machine, at a loading rate of 2 inches/minute, the adhesive joint was found to have a shear strength greater than that of polyethylene film (shear strength of polyethylene film=7.2 pounds/inch width) and a peel strength of 9.0 pounds/inch of width.

When the procedure was repeated with ten mil thick polyethylene sheets, the adhesive joint was found to have a shear strength greater than that of polyethylene film (shear strength of polyethylene film=8.6 pounds/inch width) and a peel strength of 8.9 pounds/inch of width.

What is claimed is:

1. An adhesive composition for polyolefins consisting essentially of a homogeneous, completely miscible, fluid blend of pitch, a polymer produced from a vinyl alkyl ether represented by the formula $$R-O-\overset{H}{\underset{|}{C}}=CH_2$$

wherein R is an alkyl radical having from 1 to 20 carbon atoms, and at least one inert viscosity modifier.

2. A composition as in claim 1 wherein R is an alkyl radical having from 2 to 8 carbon atoms.

3. An adhesive composition for polyolefins consisting essentially of a homogeneous, completely miscible, fluid blend of from about 10 parts by weight to about 90 parts by weight of pitch, from about 2 parts by weight to about 50 parts by weight of a polymer produced from a vinyl akyl ether represented by the formula $$R-O-\overset{H}{\underset{|}{C}}=CH_2$$

wherein R is an alkyl radical having from 1 to 20 carbon atoms, and from about 5 parts by weight to about 96 parts by weight of at least one inert viscosity modifier.

4. An adhesive composition for polyolefins consisting essentially of a homogeneous, completely miscible, fluid blend of from about 20 parts by weight to about 70 parts by weight of pitch, from about 5 parts by weight to about 30 parts by weight of a polymer produced from a vinyl alkyl ether represented by the formula $$R-O-\overset{H}{\underset{|}{C}}=CH_2$$

wherein R is an alkyl radical having from 2 to 8 carbon atoms, and from about 25 parts by weight to about 67 parts by weight of at least one inert viscosity modifier.

5. An adhesive composition for polyolefins consisting essentially of a homogeneous, completely miscible, fluid blend of from about 10 parts by weight to about 90 parts by weight of a coal hydrogenation pitch, from about 2 parts by weight to about 50 parts by weight of a polymer produced from a vinyl alkyl ether represented by the formula $$R-O-\overset{H}{\underset{|}{C}}=CH_2$$

wherein R is an alkyl radical having from 2 to 8 carbon atoms, and from about 5 parts by weight to about 96 parts by weight of at least one inert viscosity modifier.

6. An adhesive composition for polyolefins consisting essentially of a homogeneous, competely miscible, fluid blend of from about 10 parts by weight to about 90 parts by weight of a coal tar pitch, from about 2 parts by weight to about 50 parts by weight of a polymer produced from a vinyl alkyl ether represented by the formula

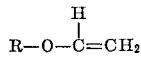

wherein R is an alkyl radical having from 2 to 8 carbon atoms, and from about 5 parts by weight to about 96 parts by weight of at least one inert viscosity modifier.

7. An adhesive composition for polyolefins consisting essentially of a homogeneous, completely miscible, fluid blend of from about 10 parts by weight to about 90 parts by weight of a coal hydrocarbonization pitch, from about 2 parts by weight to about 50 parts by weight of a polymer produced from a vinyl alkyl ether represented by the formula

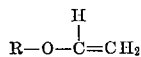

wherein R is an alkyl radical having from 2 to 8 carbon atoms, and from about 5 parts by weight to about 96 parts by weight of at least one inert viscosity modifier.

8. An adhesive composition for polyolefins consisting essentially of a homogeneous, completely miscible, fluid blend of from about 10 parts by weight to about 90 parts by weight of a tall oil pitch, from about 2 parts by weight to about 50 parts by weight of a polymer produced from a vinyl alkyl ether represented by the formula

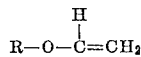

wherein R is an alkyl radical having from 2 to 8 carbon atoms, and from about 5 parts by weight to about 96 parts by weight of at least one inert viscosity modifier.

9. An adhesive composition for polyolefins consisting essentially of a homogeneous, completely miscible, fluid blend of from about 10 parts by weight to about 90 parts by weight of a tall oil pitch, from about 2 parts by weight to about 50 parts by weight of a polymer produced from a vinyl alkyl ether represented by the formula

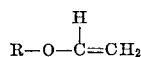

wherein R is an alkyl radical having from 2 to 8 carbon atoms, from about 1 part by weight to about 15 parts by weight of an alkyl cellulose, and from about 5 parts by weight to about 95 parts by weight of an inert liquid solvent.

10. An adhesive composition for polyolefins consisting essentially of a homogeneous, completely miscible, fluid blend of from about 10 parts by weight to about 90 parts by weight of a tall oil pitch, from about 2 parts by weight to about 50 parts by weight of a polymer produced from a vinyl alkyl ether represented by the formula

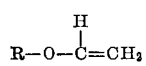

wherein R is an alkyl radical having from 2 to 8 carbon atoms, from about 1 part by weight to about 15 parts by weight of ethyl cellulose, and from about 5 parts by weight to about 95 parts by weight of an inert liquid solvent.

11. An adhesive composition for polyolefins consisting essentially of a homogeneous, completely miscible, fluid blend of from about 20 parts by weight to about 65 parts by weight of a tall oil pitch, from about 5 parts by weight to about 30 parts by weight of a polymer produced from a vinyl alkyl ether represented by the formula

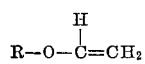

wherein R is an alkyl radical having from 2 to 8 carbon atoms, from about 2 parts by weight to about 12 parts by weight of ethyl cellulose, and from about 35 parts by weight to about 65 parts by weight of an inert liquid solvent.

12. An adhesive composition for polyolefins consisting essentially of a homogeneous, completely miscible, fluid blend of from about 10 parts by weight to about 90 parts by weight of pitch, from about 2 parts by weight to 50 parts by weight of poly(vinyl ethyl ether), and from about 5 parts by weight to about 96 parts by weight of at least one inert viscosity modifier.

13. An adhesive composition for polyolefins consisting essentially of a homogeneous, completely miscible, fluid blend of from about 10 parts by weight to about 90 parts by weight of pitch, from about 2 parts by weight to about 50 parts by weight of poly(vinyl n-butyl ether), and from about 5 parts by weight to about 96 parts by weight of at least one inert viscosity modifier.

14. An adhesive composition for polyolefins consisting essentially of a homogeneous, completely miscible, fluid blend of from about 10 parts by weight to about 90 parts by weight of a coal hydrogenation pitch, from about 2 parts by weight to about 50 parts by weight of poly(vinyl ethyl ether), and from about 5 parts by weight to about 96 parts by weight of at least one inert viscosity modifier.

15. An adhesive composition for polyolefins consisting essentially of a homogeneous, completely miscible, fluid blend of from about 10 parts by weight to about 90 parts by weight of a coal tar pitch, from about 2 parts by weight to about 50 parts by weight of poly(vinyl ethyl ether), and from about 5 parts by weight to about 96 parts by weight of at least on inert viscosity modifier.

16. An adhesive composition for polyolefins consisting essentially of a homogeneous, completely miscible, fluid blend of from about 10 parts by weight to about 90 parts by weight of a coal hydrogenation pitch, from about 2 parts by weight to about 50 parts by weight of poly(vinyl n-butyl ether), and from about 5 parts by weight to about 96 parts by weight of at least one inert viscosity weight of at least an inert viscosity modifier.

17. An adhesive composition for polyolefins consisting essentially of a homogeneous, completely miscible, fluid blend of from about 10 parts by weight to about 90 parts by weight of a coal hydrocarbonization pitch, from about 2 parts by weight to about 50 parts by weight of poly(vinyl ethyl ether), and from about 5 parts by weight of about 96 parts by weight of at least one inert viscosity modifier.

18. An adhesive composition for polyolefins consisting essentially of a homogeneous, completely miscible, fluid blend of from about 10 parts by weight to about 90 parts by weight of a tall oil pitch, from about 2 parts by weight to about 50 parts by weight of poly(vinyl ethyl ether), and from about 5 parts by weight to about 96 parts by weight of at least one inert viscosity modifier.

19. An adhesive composition for polyolefins consisting essentially of a homogeneous, completely miscible, fluid blend of from about 20 parts by weight to about 65 parts by weight of a tall oil pitch, from about 5 parts by weight to about 30 parts by weight of poly(vinyl ethyl ether), from about 2 parts by weight to about 12 parts by weight of an alkyl cellulose, and from about 35 parts by weight to about 65 parts by weight of an inert liquid solvent.

20. An adhesive composition for polyolefins consisting essentially of a homogeneous, completely miscible, fluid blend of from about 20 parts by weight to about 65 parts by weight of a tall oil pitch, from about 5 parts by weight to about 30 parts by weight of poly(vinyl ethyl ether), from about 2 parts by weight to about 12 parts by weight of ethyl cellulose, and from about 35 parts by weight to about 65 parts by weight of an inert liquid solvent.

21. A structure comprising a polyolefin adhered to a substrate by means of an adhesive produced by drying a composition consisting essentially of a homogeneous, completely miscible, fluid blend of from about 10 parts by weight to about 90 parts by weight of pitch, from about 2 parts by weight to about 50 parts by weight of a polymer produced from a vinyl alkyl ether represented by the formula

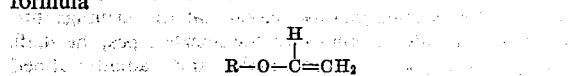

wherein R is an alkyl radical having from 1 to 20 carbon atoms, and from about 5 parts by weight to about 96 parts by weight of at least one inert viscosity modifier.

22. A structure comprising a polyolefin adhered to a substrate by means of an adhesive produced by drying a composition consisting essentially of a homogeneous, completely miscible, fluid blend of from about 10 parts by weight to about 90 parts by weight of pitch, from about 2 parts by weight to about 50 parts by weight of poly(vinyl ethyl ether), and from about 5 parts by weight to about 96 parts by weight of at least one inert viscosity modifier.

23. A structure comprising a polyolefin adhered to a substrate by means of an adhesive produced by drying a composition consisting essentially of a homogeneous, completely miscible, fluid blend of from about 10 parts by weight to about 90 parts by weight of pitch, from about 2 parts by weight to about 50 parts by weight of poly(vinyl n-butyl ether), and from about 5 parts by weight to about 96 parts by weight of at least one inert viscosity modifier.

24. A structure as in claim 21 wherein the polyolefin is polyethylene.

25. A structure as in claim 22 wherein the polyolefin is polyethylene.

26. A structure as in claim 23 wherein the polyolefin is polyethylene.

27. A structure as in claim 22 wherein polyethylene is adhered to polyethylene.

28. A structure as in claim 23 wherein polyethylene is adhered to polyethylene.

29. A structure as in claim 22 wherein polypropylene is adhered to polypropylene.

References Cited

UNITED STATES PATENTS 2,697,084  12/1954  Eger _____ 260—28.5

FOREIGN PATENTS 452,476  11/1948  Canada.
210,541  7/1955  Australia.

OTHER REFERENCES

Delmonte: "Technology of Adhesives," Reinhold Publishers, 1947, pp. 137 and 297–300.

Nickerson: "Plastics World," December 1961 ed., p. 40.

WILLIAM H. SHORT, *Primary Examiner.*

E. NIELSEN, *Assistant Examiner.*